Sept. 30, 1969  E. M. MOFFATT  3,470,395
ACOUSTIC WAVE SENSOR
Filed Dec. 30, 1966
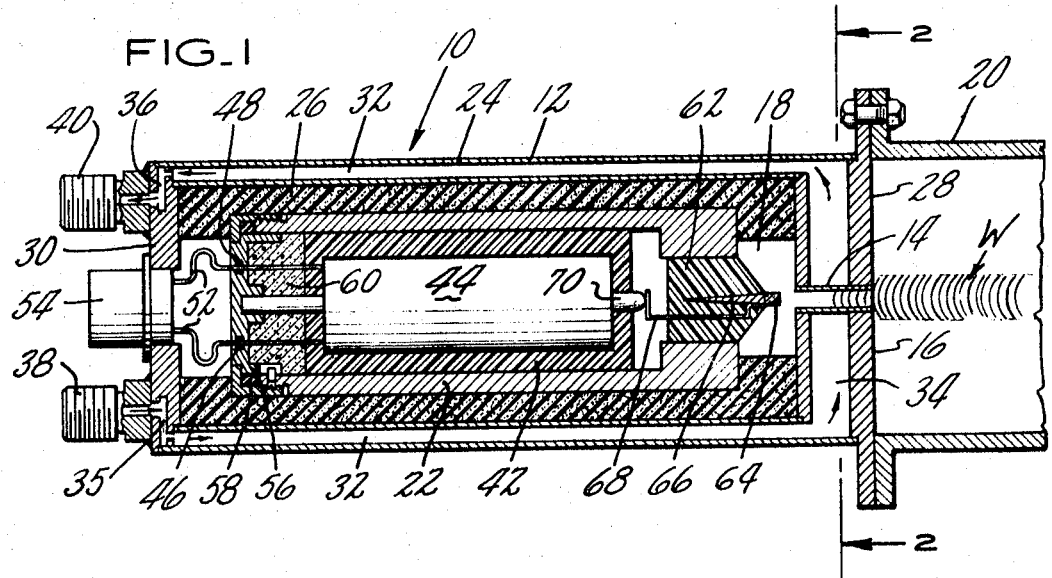
FIG.1
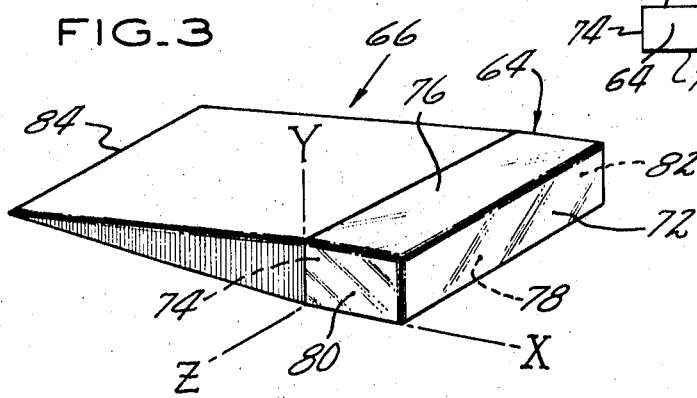
FIG.2
FIG.3
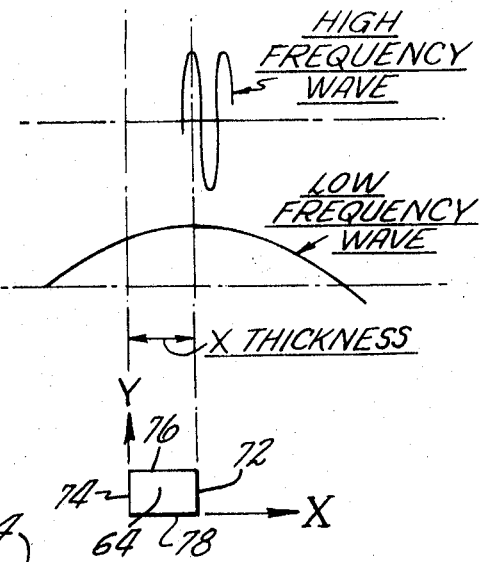
FIG.4
HIGH FREQUENCY WAVE
LOW FREQUENCY WAVE
X THICKNESS
INVENTOR
E. MARSTON MOFFATT
BY Louis P. Reens
ATTORNEY U̇nited States Patent Office 3,470,395
Patented Sept. 30, 1969

3,470,395
ACOUSTIC WAVE SENSOR
Elbert Marston Moffatt, Glastonbury, Conn., asisgnor to United Aircraft Corporation, East Hartford, Conn., a corporation of Delaware
Filed Dec. 30, 1966, Ser. No. 606,275
Int. Cl. H04r 17/00; H01v 7/02
U.S. Cl. 310—8.1                          10 Claims

ABSTRACT OF THE DISCLOSURE

This disclosure relates to a damped acoustic wave transducer which detects the leading edge of a wave impinging on the transducer. Besides being damped, the transducer acts as a high-pass filter by rejecting noise composed of low frequency pressure waves. The sensing unit for the transducer employs a piezoelectric crystal mounted on a damping fin and the transducer is equipped to operate in hostile environments having varying extremes in vibration level and temperature.

BACKGROUND OF THE INVENTION

This invention relates to a piezoelectric transducer for detecting acoustic pressure waves such as shock pulses.

It is common practice to detect acoustic pressure waves by means of piezoelectric crystals. The crystals produce very small voltage signals along their sensitive axes when the crystals are strained by pressure waves impinging upon them. The voltages are generated on the sensitive surfaces by a static charge displacement as compression and shear waves pass through the crystal. The waves normally create reflected waves at the surfaces of the crystal which also generate voltages along the sensitive axes. These reflected waves produce the characteristic "ringing" found in undamped crystal outputs. This "ringing" is particularly prominent at resonant frequencies and detracts from the usefulness of the crystal when it is periodically subjected to pressure wave pulses.

It is desirable to use transducers employing the piezoelectric effect without being confronted with the "ringing" problem. For instance, gas flow measurements can be continuously made by periodically sending sonic pulses up and downstream in the flow and measuring the difference in time that it takes the pressure pulses to traverse the distance in each direction. With each pulse being detected both upstream and downstream, it is most desirable that the "ringing" effects be damped out rapidly during the sampling period.

One approach to the damping problem is shown in U.S. Patent No. 2,707,755 wherein a special backing is attached to the crystal to dissipate the reflected pressure waves. This backing, however, must be made from a specially formulated material which is costly to manufacture due to a required variation in the density of the backing. Also, in flowing-gas environments, it is desirable for the pulse detector to filter out spurious pressure waves associated with the gas flow. This is possible by confining the sensitivity of the detector to a frequency spectrum outside of that including the spurious signals and by making the transducer directionally sensitive to the source of the timing pulse.

SUMMARY OF THE INVENTION

It is a primary object of this invention to teach the construction of an improved piezoelectric transducer.

In accordance with this object, a piezoelectric crystal is provided with an energy absorbing damping fin which is mounted to the surface of the crystal opposite an approaching pressure wave. The fin is mounted in an absorption block with three of the sensitive surfaces of the crystal exposed to the pressure wave. The absorption block aids the damping fin in dissipating the energy of the pressure wave and the exposure of three sensitive surfaces of the crystal aids in filtering out selected acoustical frequencies.

The dimensioning of the crystal is also used to adjust the frequency response of the crystal as well as the output signal level and the directional sensitivity of the crystal. The proportioning of the crystal dimensions is selected so that various resonant modes of vibration are not mutually supporting.

The directional sensitivity of the transducer is also aided by positioning the crystal at the inner end of a conduit through which the pressure waves must pass to be detected. The damped sensing unit, composed of the crystal and fin, is rigidly spaced from a signal amplifier in the transducer housing so that the capacitive coupling between the amplifier and the crystal does not interfere with the crystal signals. The rigidly spaced amplifier and crystal are in turn resiliently mounted within the transducer housing to protect these elements from vibrations. The housing of the piezoelectric transducer can be heated or cooled by means of a temperature controlled fluid to hold the temperature of the sensitive elements substantially constant.

Other features and advantages will be apparent from the description and accompanying drawings which illustrate an embodiment of the invention.

BRIEF DESCRIPTION OF THE DRAWINGS

FIG. 1 is a sectional view of the transducer mounted on a wave-carrying duct.

FIG. 2 is a cross-sectional view of the transducer taken along the line 2—2 of FIG. 1.

FIG. 3 is an isometric view of my piezoelectric sensing unit showing the crystal and damping fin.

FIG. 4 shows the pressure distribution across the crystal for both high and low frequency waves.

DESCRIPTION OF THE PREFERRED EMBODIMENTS

Referring to FIG. 1, the transducer, generally designated as 10, is shown mounted by means of a flanged end plate 28 to a duct 20 through which the pressure wave W is travelling. The pressure wave W enters the transducer housing 12 through an axial conduit 14 located in the end plate 28. The conduit 14 leads from the external surface 16 of the housing 12 to a cavity 18 located within the housing 12. When the pressure wave W impinges upon the surface 16, a portion of the wave passes through the conduit along a straight path into the cavity 18. The pressure waves travelling through the duct 20 which enter the cavity 18 must be substantially in line with the axis of the conduit 14 in order to reach the cavity 18. Pressure waves which are not substantially aligned with the conduit 14 will strike the inner walls of the conduit 14 and be reflected back and forth between the walls until their strength is depleted. The conduit 14, therefore, must be sufficiently long to render the transducer directionally sensitive. As shown in FIG. 2, the conduit is oblong in section, the vertical dimension of the opening being less than the horizontal dimension and several times less than the length of the conduit. With such a cross-sectional opening, waves travelling in a vertical plane and striking the opening at an angle will be attenuated within the conduit 14 to a greater extent than a wave travelling in a horizontal plane. Attenuation of the latter pressure waves is further accomplished by means to be described hereinafter.

In order to hold the temperature of the transducer 10 constant in spite of environmental changes, the cylindrical wall 24 has passages 32 which circulate a fluid through the annular chamber 34 adjacent to end plate 28. The annular plate 28, being the closest to the duct 20 from which heat could be conducted, provides a large surface area from which heat can be transferred to the fluid moving through the annular chamber 34. The passages 32 are individually connected to either inlet port 35 or return port 36 in the end plate 30. Connectors 38 and 40 are used to pass the circulating fluid between a temperature control unit (not shown) and the ports 35 and 36. The walls of housing 12 with internal passages 32 and chamber 34 form a jacket through which heat may be added or subtracted to control the temperature of the sensitive elements.

Mounted within the housing 12 is a cylindrical casing 22. The casing is supported from the cylindrical wall 24 of the housing 12 by means of a resilient cushion 26 of sponge rubber which holds the casing 22 both axially and radially between the cylindrical transducer walls 24.

Mounted within the casing 22 in potting compound 42 in an amplifier 44. Amplifier 44 is connected by a number of flexible conductors 52 to a plug 54 through which power and the electrical signals are transferred. In order to keep the interior of the casing 22 moisture proof, the end cap 56 of the casing 22 contains conductor seals 46 and 48 and an O-ring 58 seals the end cap 56 at the casing wall. A desiccant material 60 is added within the casing 22 to absorb any residual moisture and thus keep electrical resistance high.

The end of the casing 22 adjacent to the cavity 18 contains a support block 62 which is also formed from electrical potting compound. The support block 62 seals this end of the casing 22 and also provides a base upon which the piezoelectric sensing unit is mounted. The piezoelectric sensing unit is composed of a rectangular piezoelectric crystal 64 and an electrically conductive damping fin 66. A signal lead 68 connects the damping fin 66 to the input terminal 70 of the amplifier 44. The crystal 64 is joined to the damping fin 66 on the surface of the crystal opposite the approaching pressure wave.

The resiliently mounted casing 22 supports both the amplifier 44 and the crystal 64. The casing 22, therefore, protects these sensitive elements from shocks and vibrations. The amplifier 44 and the crystal 64 are also rigidly fixed with respect to one another within the casing 22 so that the capacitive load between the two will not change. This prevents noise signals from being introduced into the pressure readings due to relative movement of the amplifier 44, crystal 64 and signal lead 68.

Referring to FIG. 3, the sensing unit is shown in greater detail. The rectangular crystal 64 has two sensitive axes conventionally designated X and Y. The Z axis is not a sensitive axis. The X axis is perpendicular to both the front surface 72 upon which the pressure wave impinges and to the oppositely disposed rear surface 74 to which the damping fin 66 is joined. The Y axis is perpendicular to the X axis and to the upper surface 76 and lower surface 78 of the crystal. The Z axis is similarly perpendicular to the X and Y axes and to end surfaces 80 and 82. This crystal 64 is of the type which is unresponsive to hydrostatic pressure. The crystal is made from quartz; however, other crystals of the non-pyroelectric types may be used. Specifically any crystals of classes 6, 9, 11, 12, 18, 21, 22, 24, 28, 31 in the Voigt classification can be used. The front surface 72 and the rear surface 74 are the surfaces between which a voltage is generated when a compressive force on the surfaces 76 and 78 of the crystal perpendicular to the Y axis also generates a voltage on the surfaces 72 and 74; however, this voltage is equal and opposite in polarity to the signal generated by the same force on the X axis. It is for this reason that the crystal is unresponsive to hydrostatic pressure. When a pressure wave strikes the front surface 72, a voltage would be generated between the front surface 72 and the rear surface 74. However, as the pressure wave moves externally around the crystal and submerges the crystal, the pressure applied to the surfaces 76 and 78 develops an equal and opposite voltage on the surfaces 72 and 74 which reduces the voltage output to zero.

It is necessary in using the crystal to pick off the voltages from the surfaces 72 and 74. The electrode for the front surface 72 can be formed by a thin metal coating which will not interfere with the forces applied by the pressure wave. The coating holds the front surface 72 of crystal 64 at ground potential through a connection (not shown) to the amplifier. The electrode for the rear surface 74 of the crystal 64 which is connected to amplifier 44 by signal lead 68 is formed by the body of the electrically conductive fin 66 which is bonded to the rear surface 74. The capacitive coupling between the crystal 64 and fin 66 is sufficient to transmit signals through the fin 66 to the amplifier 44. For reasons to be explained hereinafter, the abutting surface of the fin 66 should be equal in area to the rear surface 74 of the crystal 64 and the body of the fin 66 should taper away from the abutting surface to a sharp edge 84 at the rear of the fin 66. The fin 66 should also have substantially the same specific acoustical impedance to pressure waves as the crystal 64. In the preferred embodiment, the crystal 64, made of quartz, is matched with a fin 66 made of aluminum.

In mounting the sensing unit in the cavity 18, the aluminum fin 66 is embedded in the support block 62 so that it is in firm contact with the potting compound and the crystal mounting end protrudes slightly from the block 62. The crystal 64 is supported on the protruding end of the fin 66 so that the front surface 72 of the crystal 64 adjacent to the inner opening of the conduit 14 is centered on and perpendicular to the axis of the conduit 14 as shown in FIGS. 1 and 2. This places the crystal 64 in the path of pressure waves which enter the cavity 18 through the conduit 14. The rear surface 74 is bonded to the protruding end of the fin 66 near the surface of the support block 62 with the remaining crystal surfaces exposed to the incoming pressure wave W. This places the sensitive X axis parallel to the axis of the conduit 14 and consequently pressure waves travelling through the conduit 14 will strike the front surface 72 and generate a signal along the X axis which is amplified and fed to plug 54.

OPERATION

It is an important teaching of this invention that the aluminum fin 66 dissipate the pressure waves admitted to the transducer after they are detected. This is accomplished in the following manner. When a pressure wave W, moving through the cavity 18, strikes the front surface 72 of the crystal 64, it establishes another pressure wave travelling at a much higher speed within the crystal 64. It is this wave within the crystal 64 which develops the voltage along the sensitive X axis. When the wave reaches the rear surface 74, it could be reflected and the crystal would begin "ringing." If the acoustic properties through the interface of the crystal 64 and fin 66 are not discontinuous, a large portion of the wave will pass into the damping fin rather than be reflected.

To prevent reflection it is important that the bonded surfaces of the fin and crystal be equal in area and that the specific acoustical impedance of the crystal 64 and fin 66 be substantially the same. By keeping the areas and impedances the same, the pressure wave is transmitted into the fin without being forced to suddenly change the distribution of the energy within the wave. The abutting surfaces of the crystal 64 and fin 66 must be so intimately joined that the bonding material is effectively transparent to the pressure wave. This result is aided by keeping any film of bonding material between the crystal 64 and fin 66 as thin as possible, or by choosing a bonding material having the same specific acoustical impedance as the crystal, or by limiting the material to a bead around the perimeter of the interface.

Once in the tapered body portion of the fin 66, the wave continues to travel toward the sharp rear edge 84. As the pressure wave travels into the region of smaller cross section, the energy per unit volume, or the intensity of the wave, is increased. Theoretically, the energy per unit volume could reach infinity at the sharp rear edge of the fin; however, this never actually happens. The energy of the wave is dissipated throughout the fin 66 by mechanically displacing the molecules of the material. This "working" of a material causes the high intensity energy to be rapidly expended. Aluminum is a particularly good damping material because of its high mechanical hysteresis property. By the time the wave reaches the sharp rear edge of the crystal, it will be sufficiently dissipated and no reflected wave will be generated.

A small amount of the wave energy will also cause minute deflections of the fin 66 at its surface. These deflections are absorbed by the support block 62 which is firmly in contact with the fin 66. It is important that the specific acoustical impedance of the fin 66 and the support block 62 be substantially different so that the pressure wave is not transmitted from the fin 66 into the block material. If this were to happen, the wave would pass rearwardly to the back of the support block 62 where a reflected wave would be generated and sent back into the crystal 64.

It is another important teaching of this invention that the sensing unit, composed of the crystal 64 and fin 66, be unresponsive to pressure waves having a frequency spectrum substantially different from the pressure pulse to be detected. A pressure pulse having a sharp leading wave front can be shown to be composed of both high and low frequency components when broken down by Fourier analysis. This sensor unit detects the high frequency components and filters out wave fronts consisting of low frequency components.

Filtering is accomplished primarily by the mounting and sizing of the piezoelectric crystal. As mentioned above, when a pressure wave W strikes the front surface 72 of the crystal 64, the impact establishes an internal wave travelling much faster in the crystal 64 than the external wave W travels through the air. The time necessary for the internal wave to travel from the front surface 72 to the rear surface 74 is the time necessary for the voltage to build up between these surfaces. This is the rise time of the crystal and it is much shorter than the time the acoustic pressure wave W takes to submerge the crystal 64 by traversing the same distance in air. When the external wave W has traversed this distance, however, the output of the crystal 64 will be zero since the pressure wave W will have submerged the hydrostatically unresponsive crystal 64. The crystal output, therefore, will rise rapidly when a sharp wave front strikes the front surface 72 and then will gradually diminish as the crystal 64 is submerged. It is this characteristic which renders the crystal 64 unresponsive to low frequency waves.

Reference to FIG. 4 will give a better understanding of the filtering ability of the crystal 64. FIG. 4 illustrates the pressure distribution of a high frequency wave front and a low frequency wave front along the X axis of the crystal. The leading edge of the high frequency wave is very steep compared with the leading edge of the low frequency wave. When the leading edge of the high frequency wave strikes the front surface 72 of the crystal, a voltage approximately proportional to the pressure at the surface 72 is established between surfaces 72 and 74 during the rise time. The magnitude of the voltage generated by the low frequency wave having the same pressure at the surface 72 will never achieve the voltage level created by the high frequency wave because the pressure applied along the X axis is not appreciably different from the pressure applied along the Y axis. Such pressure distribution is substantially hydrostatic and the crystal 64 will not respond. It will be recognized that submersion does not occur with a high frequency wave, or a pulse having a steep wave front comprised of high frequency waves, until after the crystal voltage has reached a value substantially proportional to the maximum pressure because the rise time of the crystal is much shorter than the period of time necessary for the wave to submerge the sides of the crystal. Pressure wave fronts consisting of low frequency waves will submerge the crystal before the maximum pressure reaches surface 72 (see FIG. 4), and, therefore, low frequency waves pass without being detected.

The upper range of the low frequency spectrum to be filtered out, the corner frequencies, can be adjusted by selecting a crystal of appropriate thickness along the X axis. I have found that the crystal thickness along the X axis should not be more than half of the quarter wave length of the corner frequencies desired. In a jet engine inlet, it is necessary to keep the X distance very small, .09 inch, to eliminate the upper range of the low frequency noise. An X thickness of .09 inch has corner frequencies of approximately 18,000 c.p.s. This crystal has a rise time of approximately .45 microsecond for a square pulse front and the pulse travelling through the air submerges the crystal in approximately 7 microseconds.

When a pressure wave strikes the front surface 72 to place the crystal 64 in compression, a shear wave, as well as a compressive wave, is established in the crystal. By keeping the Y thickness of the crystal smaller than the X thickness, the resonant frequency of this shear wave is kept above the resonant frequency of the compression wave so that "ringing" of both waves is not mutually supporting. By keeping the Y thickness no more than two-thirds of the X dimension, an effective separation is established.

By limiting the X and Y thicknesses of the crystal as described above, the energy output of the crystal is reduced. This output can be increased by making the Z thickness of the crystal very large since the energy output of the crystal is a function of the crystal volume.

In addition to increasing the energy output, an increased Z thickness causes the crystal to be more directionally sensitive. A wave front travelling in the X–Z plane and striking one end of the crystal at an angle reaches the other end of the long crystal at a slightly different time which attenuates the crystal signal. Also, the phase of the wave at any instant in time will be different at each end of the crystal, the difference depending upon the wave length of the pressure wave and the Z thickness of the crystal. This also attenuates the signal. A wave front approaching the crystal surface directly, strikes the surface simultaneously and in phase at all points along the surface to yield a maximum output. Generally, the larger the Z thickness, the more directional the crystal becomes; however, a point is reached where an increase in the Z thickness results in an insignificant increase in directional sensitivity.

The opening of the conduit 14 adjacent to the crystal 64 must have the same proportions as the crystal surface 72. As shown in FIG. 2, the projection of the conduit opening onto the surface 72 corresponds in size and shape to the front surface 72 to allow the wave to reach the whole surface 72. The wide opening reduces the directional discrimination of the conduit but this loss is compensated for by the increased directional sensitivity of the wide-faced crystal. I have found that a crystal having X:Y:Z dimensions of .09:.06:.50 inch provides a measurable output without significant "ringing" due to the shear wave; however crystals with larger Z dimensions may also be used for increased output and discrimination.

It should be understood that the invention is not limited to the particular embodiments shown and described herein, but that various changes and modifications may be made without departing from the spirit or scope of this novel concept as defined by the following claims.

I claim:
1. A damped piezoelectric sensor for detecting an acoustical pressure wave comprising:
   (a) a housing (12) defining a cavity therewithin and adapted to admit the pressure wave along a prescribed path into the cavity;
   (b) a support block (62) mounted within the cavity in the path of the admitted pressure wave;
   (c) a piezoelectric crystal (64) having a sensitive axis (X axis) perpendicular to two oppositely disposed surfaces (72, 74) of the crystal and a specific acoustical impedance substantially different from that of the block (62); and
   (d) a pressure wave absorber (66) having one end embedded in the block (62) and the other end supporting the crystal outside of the block (62) within the cavity, the one (74) of said surfaces of the crystal being in abutting relationship with the absorber and the other (72) of said surfaces disposed in the path of the admitted wave, the absorber (66) and the crystal (64) having substantially the same specific acoustical impedance and abutting surfaces of substantially the same area to prevent reflection of the pressure wave at the interface of the absorber and crystal, the cross-sectional area of the absorber decreasing toward the embedded end to aid in the dissipation of the pressure wave.

2. A sensor unit for detecting acoustical wave fronts generated by a wave source and comprised of high frequency pressure waves and for filtering out acoustical wave fronts consisting of low frequency pressure waves comprising:
   (a) a piezoelectric crystal (64) which is unresponsive to hydrostatic pressure, the crystal having a first sensitive axis (X axis) perpendicular to a second sensitive axis (Y axis) and to a pair or oppositely disposed crystal surfaces (72,74), the thickness of the crystal along the first sensitive axis (X axis) being selected to establish the upper range of the low frequency waves to be filtered out; and
   (b) a crystal mounting member (66) positioned with respect to the source so that one surface of the member is parallel to the approaching wave fronts, said one surface of the member and one (74) of said oppositely disposed crystal surfaces being bonded together to expose the remaining crystal surfaces to the acoustic wave whereby acoustic wave fronts consisting of low frequency pressure waves submerge the crystal without establishing an appreciable difference between the pressures applied along each of the sensitive axes of the crystal.

3. Apparatus according to claim 2 wherein said one surface of the crystal mounting member (66) and the crystal surface (74) bonded thereto are substantially equal in area and the member (66) has the same specific acoustical impedance as the crystal and has a body portion tapering away from said one surface of the member to a sharp edge (84) to dissipate the pressure waves within the tapered body portion.

4. Apparatus according to claim 2 wherein the thickness (X) of the crystal along the first sensitive axis (X axis) is selected to be not more than half of the quarter wave length of the low frequency waves to be filtered out.

5. A damped, directionally sensitive transducer for detecting an acoustic wave comprising:
   (a) a housing (12) defining a cavity therein and having an external surface (16) exposed to the acoustic wave;
   (b) a conduit (14) leading from the external surface (16) of the housing (12) an opening into the cavity for admitting to the cavity a wave travelling substantially along the axis of the conduit;
   (c) a rectangular piezoelectric crystal (64) insensitive to hydrostatic pressure mounted within the cavity along the axis of the conduit, the crystal having a first sensitive axis (X axis) parallel to the axis of the conduit, a second sensitive axis (Y axis) perpendicular to the axis of the conduit, a front surface (72) of the crystal adjacent to the conduit and perpendicular to the first sensitive axis (X axis), a rear surface (74) of the crystal oppositely disposed from and parallel to the front surface (72) and four lateral surfaces openly exposed to pressures in the cavity, and
   (d) a widge-shaped wave absorbing fin (66) intimately joined in abutting relationship to the rear surface (74) of the crystal and tapering away from the rear of the crystal to a sharp edge (84), the fin and the crystal having substantially the same specific acoustical impedance and matching cross-sectional areas at the interface of the crystal and fin, whereby the acoustic wave travels through the crystal and the fin without being substantially reflected at the interface of the crystal and fin or at the sharp edge (84) of the fin.

6. Apparatus according to claim 5 including a support block (62) mounted within the cavity and having an acoustical impedance substantially different from the fin, said fin being embedded within the block to dissipate minute deflections created in the fin by the wave.

7. Apparatus according to claim 5 including:
   (a) a first means (44) within the housing and electrically connected to the crystal (64) for amplifying the signal generated by the pressure wave impinging on the crystal; and
   (b) a second means (22) resiliently mounted within the housing for supporting the first means (44) and the crystal (64) in fixed relation to one another to protect the first means (44) and the crystal from vibrations and to prevent changes in the capacitive load between the first means (44) and the crystal.

8. Apparatus according to claim 5 wherein two of the oppositely disposed lateral surfaces are perpendicular to the second sensitive axis and the thickness (Y) of the crystal along the second sensitive axis (Y axis) is no larger than two-thirds of the thickness (X) of the crystal along the first sensitive axis (X axis).

9. Apparatus according to claim 5 wherein:
   (a) the thickness (Z) of the crystal along an axis perpendicular to the sensitive axes is selected to establish a desired directional sensitively of the crystal to waves striking the front surface (72) of the crystal from a plane (X–Z) perpendicular to the second sensitive axis; and
   (b) the projection of the conduit opening adjacent to the crystal onto the front surface (72) of the crystal substantially corresponds in size and shape to the front surface (72) of the crystal.

10. Apparatus according to claim 5 wherein the housing has walls containing a plurality of fluid circulating passages defining a temperature control jacket.

References Cited
UNITED STATES PATENTS

| | | | |
|---|---|---|---|
| 2,624,852 | 1/1953 | Forbes | 310—8.2 |
| 2,875,354 | 2/1959 | Harris | 310—8.2 |
| 2,972,068 | 2/1961 | Howry | 310—8.2 |
| 3,112,414 | 11/1963 | Yando | 310—8.3 |
| 3,200,369 | 8/1965 | Neubauer | 340—10 |
| 3,273,146 | 9/1966 | Hurwitz | 333—30 |
| 3,264,583 | 8/1966 | Fitch | 333—30 |
| 3,271,704 | 9/1966 | Fitch | 333—30 |
| 3,272,281 | 1966 | Rutter. | |
| 3,185,868 | 1965 | Coyle. | |
| 3,403,271 | 9/1968 | Lobdell | 310—8.2 |

J D MILLER, Primary Examiner

U.S. Cl. X.R.

310—8.2, 8.3, 8.7, 9.1, 9.5; 333—72; 340—10